Sept. 26, 1961           J. B. NEALE           3,001,555
AUTOMATIC GRID MAKING MACHINE
Filed Dec. 13, 1957           2 Sheets-Sheet 1
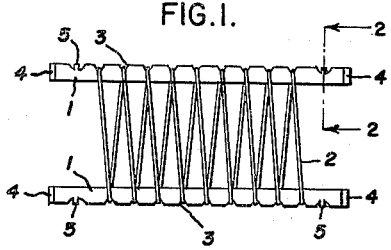
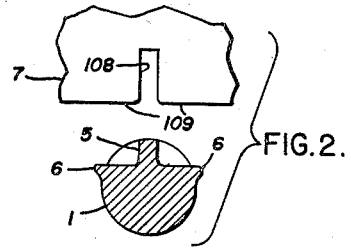
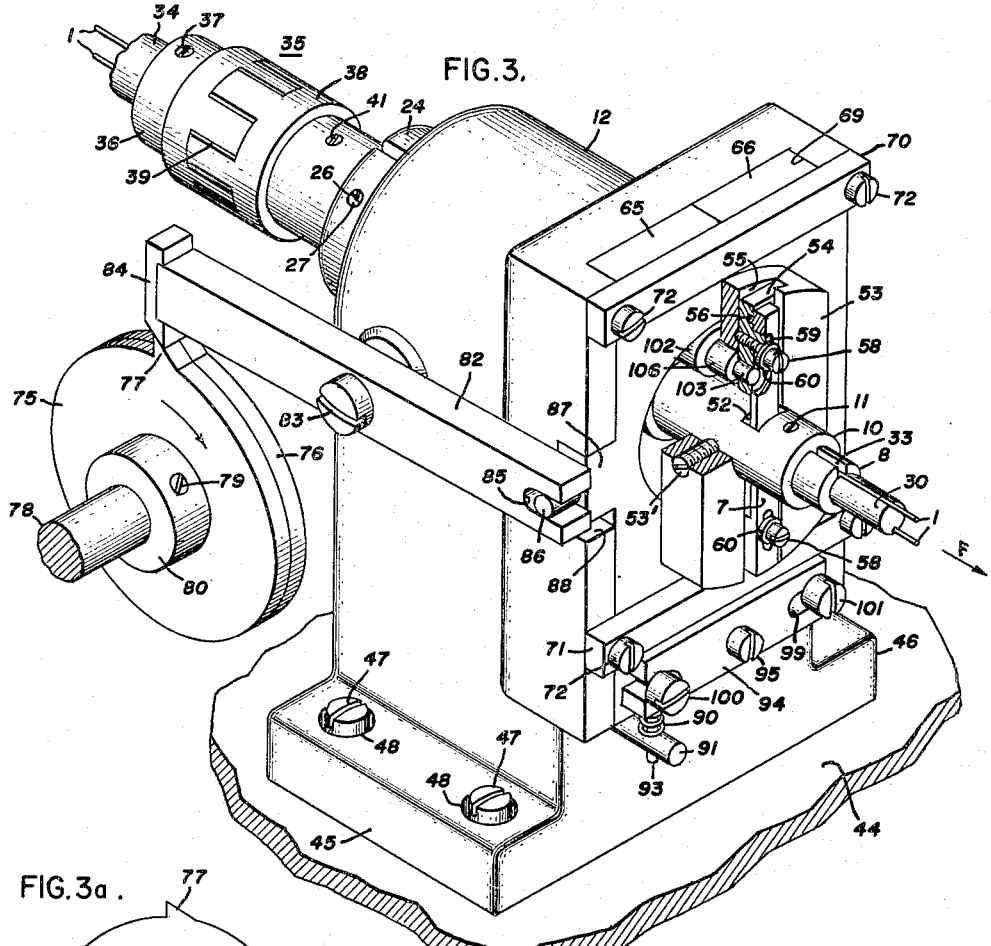
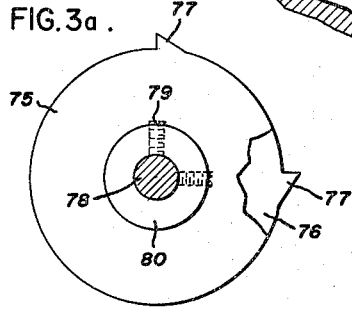
INVENTOR:
JUNIUS B. NEALE,
BY
HIS ATTORNEY.

Sept. 26, 1961      J. B. NEALE      3,001,555
AUTOMATIC GRID MAKING MACHINE
Filed Dec. 13, 1957      2 Sheets-Sheet 2
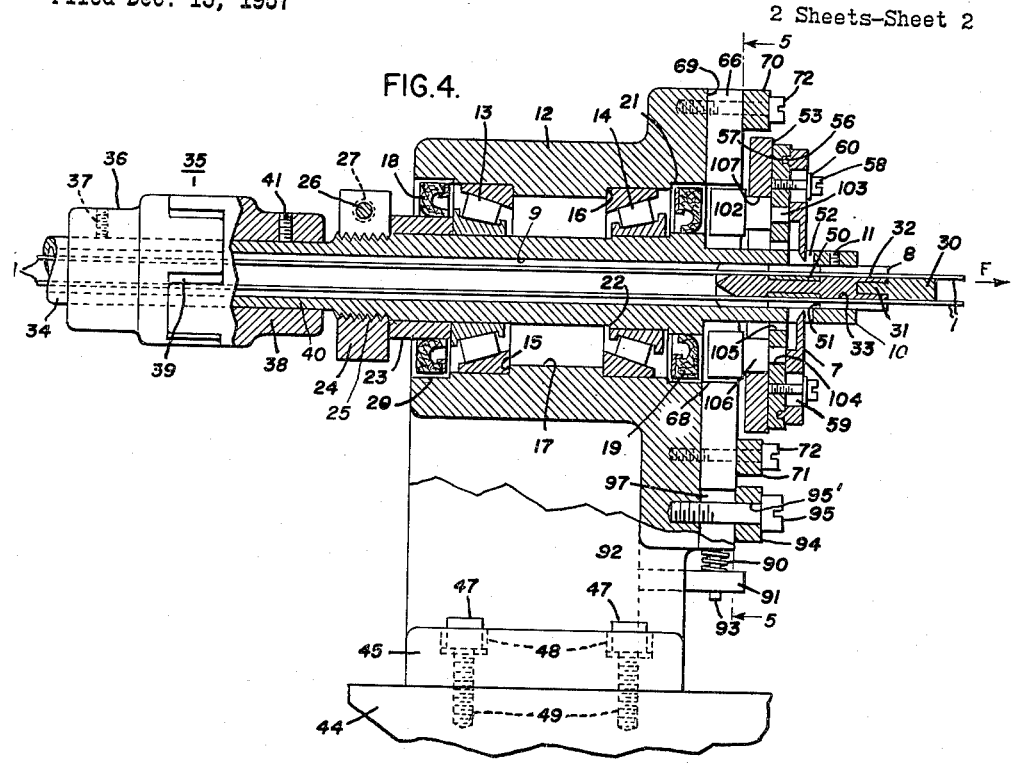
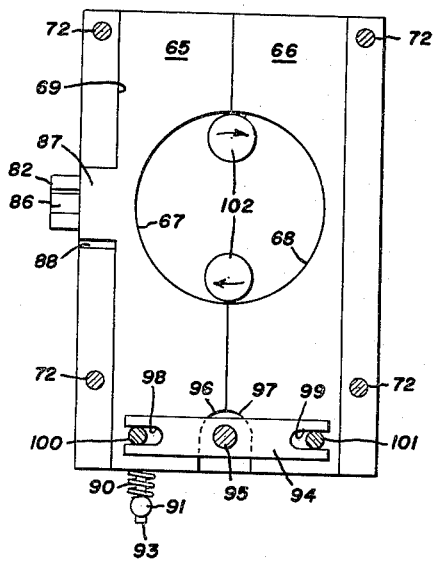 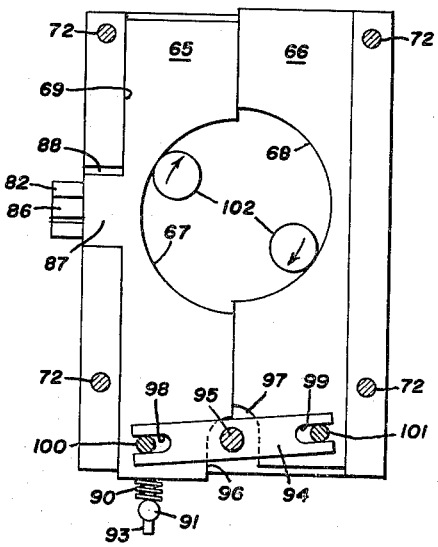
INVENTOR:
JUNIUS B. NEALE,
BY
HIS ATTORNEY.

United States Patent Office 3,001,555
Patented Sept. 26, 1961

3,001,555
AUTOMATIC GRID MAKING MACHINE
Junius B. Neale, Owensboro, Ky., assignor to General Electric Company, a corporation of New York
Filed Dec. 13, 1957, Ser. No. 702,597
6 Claims. (Cl. 140—71.5)

This invention relates to automatic machines for making grid electrodes of the type commonly used in electron discharge tubes, which consist of one or more parallel support rods having a helix of a number of turns of relatively fine wire wound thereon and secured thereto at each point of contact; and more particularly to swaging means for forming stop deformations in the support rods of such grid electrodes.

Machines for making such grid electrodes generally comprise means for forming a series of notches in support rods, means for winding a helix of relatively fine wire about the support rods so that the turns of wire lie in successive notches, and means for peening the metal of the support rods so as to close the notches over the fine wires lying therein, thereby securing the wire helix to the support rods to maintain the assembled relation of the elements of the completed grid electrode. A machine of this general type is shown in U.S. Patent No. 1,838,819 to Flaws, Jr., assigned to the same assignee as the present application. It is customary to provide means for rotating and longitudinally feeding the support wires during the operation of the grid-making machine, in order to wind the fine wire about the support rods in a helical form. It is also common practice to manufacture grids on such machines in the form of continuous strips, by winding helices of fine wire successively on support rods of indefinite length. The support rods are fed from supply reels, by continuous feeding means, onto a revolving mandrel which receives the support rods in longitudinal grooves formed in its periphery. The winding operation is carried out by feeding fine wire about the mandrel as it revolves, and as the support rods are fed along the mandrel.

Grid electrodes of this type are generally mounted in electron discharge tubes by means of discs of mica, known as mica spacers, which are formed with holes into which the support rods are inserted. A mica spacer is usually assembled at each end of the grid electrode, and these spacers support the grid electrode in spaced relation to the walls of the tube by their peripheral abutment thereon. In order to prevent the support rods from being inserted too far into the mica spacers, with consequent damage to the wire helix of the grid electrode, it has been found desirable to form stop deformations on the support rods, equally spaced from each of their ends.

It has previously been proposed to form such stop deformations on the support rods automatically and in synchronism with subsequent formation of the helix of fine wire on the support rods, by means of dies radially slidable, relative to the axis of rotation of the mandrel, into deforming engagement with the support rods. It has also been proposed to form anvil-like indentations in the mandrel to cooperate with the dies in forming the stops.

It is the object of this invention to provide improved actuating means for producing controlled operation of stop-swaging dies in synchronism with the grid electrode-forming operations of such a grid-making machine.

It is another object of the invention to provide improved means for automatically forming stop deformations in the support rods of grid electrodes formed on such a grid-making machine, which operate in synchronism with the grid-forming operations of the machine to form stops at predetermined positions along the support rods of the grid electrodes.

Further objects and advantages of the invention will be apparent from the following description. Although only a single embodiment is shown and described by way of example, many modifications will occur to those skilled in the art, and it should be understood that the invention may be adapted for use with machines for making grid electrodes having only one support rod, or having more than two support rods.

Briefly, in accordance with one aspect of this invention, there is provided an improved cam-controlled actuating means for stop-swaging dies which are rotatable with a grid electrode-forming mandrel and a mandrel-receiving arbor of a grid-making machine. The dies are radially slidable, within a head rotatably secured to the arbor, into stop-swaging engagement with support rods being fed along and rotated with the mandrel for formation of grid electrodes thereon. The improved cam-controlled actuating means includes cam members supported for non-rotatable reciprocable sliding movement in a plane parallel to the plane of rotation of the dies. The cam members are formed with female circular arcuate cam surfaces cooperating with cam followers affixed to the dies for actuation thereof. The cam members are resiliently biased to a first operational position in which their cam surfaces mutually form a circle concentric with the axis of rotation of the dies and out of contact with the rotating cam followers. They are also selectively relatively slidable, by means of linkages actuated by control cams driven in synchronism with the grid electrode-forming operations, to a second operational position in which they cooperate with the cam followers to actuate the dies to a stop-swaging position.

For a better understanding of the invention, reference may be had to the accompanying drawings, in which:

FIG. 1 is a plan view of a completed grid electrode having stops formed near the ends of the support rods thereof by the stop-swaging devices of the present invention.

FIG. 2 is a sectional end view of one of the support rods of the grid electrode of FIG. 1, showing one of the stop deformations formed therein, taken along line 2—2 in FIG. 1, looking in the driection of the arrows; together with a fragmentary portion of one of the stop-swaging dies provided for formation of the stop deformations.

FIG. 3 is a pictorial view of portions of a grid-making machine incorporating one embodiment of this invention.

FIG. 3a is a detail showing the control cams of FIG. 3 in an adjusted relatively spaced relation.

FIG. 4 is an elevation view, partially in section, of the portions of a grid-making machine shown in FIG. 3.

FIG. 5 is a sectional end view of the cam members and followers of the invention, together with certain elements cooperating therewith, taken along the line 5—5 in FIG. 4, looking in the direction of the arrows, and showing these elements in a first operational position.

FIG. 6 is a sectional end view of the same elements as shown in FIG. 5, taken along line 5—5 in FIG. 4, looking in the direction of the arrows, and showing these elements in a second operational position.

In FIG. 1, there is shown a completed grid electrode formed with stop deformations according to the means of this invention. The grid electrode includes a pair of parallel spaced-apart support rods 1, about which is wound a helix of fine wire 2, secured in notches 3 formed in the support rods. The support rods are severed at spaced points to form chisel tips 4. The chisel tips facilitate insertion of the support rods into the mica spacers which are assembled with the grid electrodes, as previously explained. Such a grid electrode is of well-known type, and the means for its formation form no part of the present invention. The stop-swaging means of the present invention are provided to form stop deformations 5 positioned near the ends of each support rod, at equal distance from the ends thereof. Stop deformations 5 prevent the insertion of the support rods too far into the mica spacers, thus protecting the wire helix 2 from distortion thereby, and also aid in the positioning of the mica spacers on the support rods.

Referring to FIG. 2, one of the stop deformations 5 is shown in a sectional end view of one of the support rods 1. The stop deformations include a pair of protruding wing-like portions 6 which serve to prevent the movement of a mica spacer past the stop deformation. The stop deformations are formed by swaging support rods 1 with a die 7. Die 7 is formed with a suitable recess 108 and end faces 109, of such configuration as to impart a desired shape to stop deformation 5.

Referring to FIGS. 3 and 4, there are shown portions of a grid-making machine embodying the stop-swaging means of this invention. These means include a mandrel 8, axially secured within a bore 9 formed in an arbor 10, by means of a set screw 11 radially threaded into the arbor and jammed against the peripheral surface of the mandrel. Mandrel 8 and arbor 10 are supported for rotation in a housing 12 by means of bearing assemblies 13 and 14. Bearing assemblies 13 and 14 are seated in housing 12 within enlarged portions 15 and 16 respectively of a bore 17 centrally formed in the housing. A supply of bearing lubricant may be placed within bore 17, and sealed therein by means of oil seal assemblies 18 and 19, seated within the ends of housing 12 within suitably formed enlarged portions 20 and 21, respectively, of the housing. Arbor 10 is secured against axial movement in one direction relative to housing 12 by means of an enlarged portion 22 of the arbor, in cooperation with bearing assembly 14.

Relative axial motion in an opposite direction is prevented by means of an annular collar 23 slidably received on arbor 10 and axially abutting bearing assembly 13. This assembly is secured in position by means of a split nut 24, threaded on a thread 25 formed in the periphery of arbor 10 into axially abutting relation with collar 23. The split nut is locked in position against accidental displacement by means of a lock screw 26 threaded into jamming engagement with a threaded hole 27 formed transversely of the split nut, in a well-known manner.

Mandrel 8 serves as a rotating former for the winding of wire helix 2 about support rods 1, and secures the support rods for the nicking and peening operations concomitant therewith. Nicking, winding, and peening devices for forming a grid electrode on the mandrel are shown in the previously cited Patent No. 1,838,819 to Flaws, Jr., and these devices will not be further described. Mandrel 8 is provided with an extension 30 of hard material, such as tungsten carbide, for cooperation with these nicking, winding and peening devices. Extension 30 is secured to mandrel 8 by means of an extension 31 thereof, which is brazed or otherwise suitably secured within a transverse slot 32 formed in one end of the mandrel.

In order to rotatably support the support rods 1 for the nicking, winding and peening operations thereon, mandrel 8 is provided with a longitudinal support rod-receiving groove 33 for each such support rod. Each groove 33 extends over the entire length of mandrel 8, and receives a support rod 1 therein for rotation therewith. The support rods are of indefinite length, and extend through bore 9 to be fed in the direction of arrow F by suitable feeding means of well-known construction (not shown). The feed of the support rods is from suitable supply reels, such as shown by the previously cited patent to Flaws, Jr., and these reels are mounted for rotation with mandrel 8.

In order to rotate mandrel 8 to carry out the winding operations, there is provided a hollow drive shaft 34, which is driven by a suitable motor (not shown). Drive shaft 34 is drivingly connected with arbor 10 by means of a flexible coupling generally designated 35, which is of standard and well-known construction. Flexible coupling 35 includes a castellated coupling half 36, secured to drive shaft 34 by means of a set screw 37 threaded radially into the coupling half and jammed against the periphery of the drive shaft. The flexible coupling also includes a second castellated coupling half 38, secured to a reduced end portion 40 of arbor 10 by means of a set screw 41 radially threaded into the coupling half and jammed against the periphery of the reduced end portion.

The castellations of the coupling halves are intercalated in mutual driving engagement through an interposed rubber spider 39, in such manner that their rotational axes need not coincide. Driving means of this nature are well-known, and will not be further described.

Housing 12 is supported by a bed plate 44 of the grid-making machine. For this purpose, housing 12 is provided with flanges 45 and 46, which are secured to bed plate 44 by means of machine screws 47 threaded through bores 48 in flanges 45 and 46, and into threaded holes 49 formed in bed plate 44. By these means, mandrel 8 and arbor 10 are secured for rotation about a fixed axis.

To facilitate proper formation of stop deformations upon support rods 1 by dies 7, mandrel 8 is provided with an anvil insert 50 for each of the support rods. Inserts 50 may be made of tungsten carbide or other relatively hard material. These inserts are secured by brazing or other suitable means within rectangular recesses 51 peripherally formed in mandrel 8. The recesses also serve to receive dies 7, and arbor 10 is formed with die-receiving slots 52 for radial passage of the dies into the recesses.

Dies 7 are supported for rotation with mandrel 8 by means of a head 53. Head 53 is secured for rotation with arbor 10 by means of a set screw 53' threaded radially into the head and into jamming engagement with the periphery of the arbor, as shown in FIG. 3. Each die 7 is supported for radial movement in head 53 by means of a slide member 54 slidably received within a groove 55 radially formed in head 53. Each die is located on its associated slide member 54 by means of a projection 56 formed on the reverse face of the die, which is seated within a suitably formed recess 57 in the face of the slide member. The die is secured in its located position on a slide member by a machine screw 58 threaded into the slide member through an elongated slot 59 formed in the die. Screw 58 is locked in position by means of a lock-washer 60.

By the means just described, dies 7 are mounted for rotation with mandrel 8, and for radial sliding movement relative to the axis of rotation of the mandrel, in such manner that they may be brought into stop-swaging engagement with support rods 1 by radial sliding motion of slide members 54 in head 53. Means are provided for selectively sliding dies 7 into stop-swaging engagement with the support rods, generally comprising cam members 65 and 66. A cam member is provided for each of dies 7; in the embodiment herein shown and described, two such cam members are employed, corresponding to the formation of a grid electrode having two support rods, as shown. The present embodiment may also be employed with a grid electrode having only one support rod; and modification of the structure for grid electrodes having more than two support rods will be described hereinafter.

Cam members 65 and 66 are respectively formed with semi-circular female cam surfaces 67 and 68, best seen in FIGS. 5 and 6. The cam members are slidingly received within a groove 69 formed in housing 12, and mutually abut along one edge for relative sliding motion.

Referring again to FIGS. 3 and 4, the cam members are slidably secured in groove 69 by means of a pair of bars 70 and 71, secured to housing 12 over spaced-apart portions of the groove by means of machine screws 72 threaded into the housing.

As best seen in FIG. 3, means are provided for producing a controlled sliding reciprocation of the cam members in groove 69. These means generally comprise control cams 75 and 76, each provided with a peripheral projection 77. The control cams are mounted on a shaft 78 for rotation therewith, by means of a collar 80 integrally formed with each such control cam, only one such collar being shown in the drawing. A set screw 79 is radially threaded through collar 80 into clamping engagement with shaft 78. The shaft is driven in the direction of the arrow through suitable driving connections by the motor driving shaft 34 (not shown).

Means are provided for translating the contours of the rotating control cams into sliding reciprocation of cam members 65 and 66. These means include a rocker arm 82 pivotally mounted on housing 12 by means of a screw 83 threaded into the housing. A wedge-shaped cam follower 84 is brazed or otherwise suitably affixed to one end of rocker arm 82 for sliding cooperation with the peripheries of cams 75 and 76, and projections 77 formed thereon. A notch 85 is formed in the opposite end of the rocker arm for cooperation with a pin 86 suitably secured to cam member 65.

In order to limit the path of sliding reciprocation of cam member 65, an ear 87 is formed thereon, which is received within a slot 88 formed in housing 12. Slot 88 is of sufficient size to permit reciprocation of cam member 65 to a first operational position shown in FIG. 5, in which cam-follower 84 rides upon the peripheries of control cams 75 and 76, and to a second operational position, shown in FIG. 6, in which cam follower 84 rides over projections 77 of the control cams. Referring again to FIGS. 3 and 4, cam member 65 is biased into the first operational position by means of a compression spring 90 interposed between this cam member and a stationary pin 91 secured in an opening 92 formed in housing 12. A guide pin 93 is axially received within compression spring 90 for guiding the spring, and passes into suitable openings (not shown) in pin 91 and cam member 65. Compression spring 90 also biases cam follower 84 into continual contact with the peripheries of control cams 75 and 76.

Further linkage means are provided to interconnect cam members 65 and 66 in such a manner that sliding movement of cam member 65 will result in sliding movement of cam member 66 in a reverse direction. These linkage means include a connecting arm 94 pivotally mounted on housing 12 by means of machine screw 95 passing through a suitable opening 95' formed centrally in the connecting arm. Machine screw 95 is threaded into housing 12. As best seen in FIGS. 5 and 6, cam members 65 and 66 are respectively formed with cut-out portions 96 and 97 to avoid interference with machine screw 95. Connecting arm 94 is formed with slots 98 and 99 at either end thereof, respectively receiving machine screws 100 and 101 in slidable driving engagement. Machine screws 100 and 101 are threaded into cam members 65 and 66, respectively, to drivingly connect them with the connecting arm.

The means just described are effective to position cam members 65 and 66 in the first operational position, i.e., that of FIG. 5, when cam follower 84 is riding upon the peripheries of control cams 75 and 76. These means are further effective to position the cam members 65 and 66 in the second operational position, i.e., that of FIG. 6, when cam follower 84 rides upon projections 77 of control cams 75 and 76.

Means are provided for transmitting the reciprocatory movements of cam members 65 and 66 to dies 7. These means comprise cam followers 102, one of which is provided for each die. A reduced portion 103 of each cam follower 102 is rotatably mounted in an opening 104 suitably formed in an associated slide member 54.

Each slide member 54 is further provided with a central opening 105 to accommodate radial sliding thereof without interference with arbor 10. Cam follower 102 and its reduced portion 103 are connected by an intermediate portion 106 passing through a slot 107 formed in head 53. Slot 107 serves to accommodate radial sliding motion of slide member 54 in head 53, and permits the slide member and its associated die and cam follower to be biased radially outwardly by centrifugal force toward a position in which portion 106 radially abuts head 53.

Referring to FIG. 5, cam followers 102 are rotated with head 53 in the direction of the arrows. In a first operational position, as shown in FIG. 5, assumed when cam follower 84 is riding about the peripheries of control cams 75 and 76, the female semi-circular cam surfaces 67 and 68 of cam members 65 and 66 form a complete circle concentric with the axis of rotation of the head. This circle is of sufficient diameter to prevent any interference of rotating cam followers 102 with the cam surfaces. When the parts are in this position, dies 7 are held in the outermost positions of portions 106 in slot 107 by centrifugal force acting thereon.

As projections 77 of control cams 75 and 76 rotate into engagement with cam follower 84, rocker arm 82 is actuated thereby to move cam members 65 and 66 toward their second operational position, shown in FIG. 6, against the bias of compression spring 90. The motion of cam member 65 downwardly rocks connecting arm 94 to drive cam member 66 upward, so that cam surfaces 67 and 68 are displaced in opposite directions to positions eccentric with the axis of rotation of cam followers 102. In this position, portions of cam surfaces 67 and 68 interfere with the path of rotation of cam followers 102. As the cam followers pass over the interfering portions of the cam surfaces, they are urged inwardly with an increasing displacement, against the outward bias of centrifugal force. The cam followers carry slide members 54 and dies 7 inwardly toward a position in which the dies engage support rods 1 to form stop deformations therein. As each cam follower 102 passes the end of a cam surface 67 or 68, it is free to return to its first operational position, as in FIG. 5, under the influence of centrifugal force, because of the previous displacement of the opposite cam surfaces in opposite directions. This will be apparent from an inspection of FIG. 6.

As projection 77 passes cam follower 84, compression spring 90, which has been compressed by the movement of cam member 65 to the position of FIG. 6, will cause the cam members to return to the first operational position of FIG. 5, carrying rocker arm 82 back to a position in which cam follower 84 rides over the peripheries of control cams 75 and 76.

Control cams 75 and 76 have been described and shown in FIG. 3 in congruent positions of projections 77. This position is used to form stop deformations at equally spaced points along the support rods. Shaft 78 is driven at such a speed that one revolution of the control cams is completed during the feeding of support rods 1 a distance equal to the desired spacing of stop deformations 5. Thus, one such stop deformation will be formed at each preselected equally-spaced point along the support rod. However, it is generally desirable to form stop deformations near the ends of adjoining grid electrodes at spacings considerably less than the distance separating the stop deformations of one grid electrode. In order to provide for the formation of stop deformations at such alternating spacings along the support rods, one of the projections 77 of control cams 75 or 76 may be angularly displaced from the other by relatively rotating the control cams on shaft 78, as in FIG. 3a so that the projections actuate dies 7 at desired intervals during each revolution of the control cams. The control cams may be secured in these adjusted positions by set screws 79. If this arrangement is employed, shaft 78 should be rotated at such a speed relative to the rate of feed of support rods 1 that the shaft makes a complete revolution during feeding of the support rods through a length equal to the desired spacing of stop deformations at the corresponding ends of adjacent grid electrodes.

It will be readily apparent that the rate of rotation of shaft 78 relative to the rate of longitudinal feed of support rods 1 over mandrel 8 may be varied to achieve any desired spacing of stop deformations on the support rods, according to the desired lengths of the finished grid electrodes.

As previously explained, the embodiment of the invention herein described may be employed equally well in the formation of grid electrodes having only one support rod. Grid electrodes having three or more support rods may be formed by the means of this invention by adding additional heads 53, dies 7, cam members 65 and 66, and their associated elements, which may be appropriately spaced along the path of longitudinal feed of support rods 1 for this purpose. It will be obvious to those skilled in the art that the elements may be readily modified to this end.

It should be understood that the invention is not limited to specific details of construction and arrangement thereof herein illustrated, and that other changes and modifications may occur to those skilled in the art without departing from the spirit and scope of the invention.

What is claimed and desired to be secured by Letters Patent is:

1. For use in a machine for making grid electrodes, of the type comprising a mandrel rotatably supported for receiving support rods of indefinite length, means for continuously feeding the support rods parallel to the axis of rotation of the mandrel; means for forming deformations in the support rods at pre-selected longitudinally spaced points thereon comprising, in combination; a head supported for rotation with said mandrel, swaging means slidable in said head into swaging engagement with said support rods, follower means affixed to each of said swaging meas for rotation therewith, cam members having complementary arcuate surfaces defining in one relative position thereof a smooth surface of revolution and in another relative position a surface having a pair of opposed discontinuities, said cam members being slidably supported for movement in a plane perpendicular to said axis of rotation, control cam means rotatable in synchronism with said head, and means operable by said control cam means to oppositely displace said cam members toward said other position in which said cam members engage said follower means to actuate said swaging means into swaging engagement with said support rods.

2. For use in a machine for making grid electrodes, of the type comprising a mandrel receiving support rods of indefinite length, a housing for rotatably supporting the mandrel, means for continuously feeding the support rods parallel to the axis of rotation of the mandrel, and means for winding and securing a helix of wire about the support rods; means for forming stop deformations in the support rods at pre-selected longitudinally spaced points thereon, comprising, in combination; a head supported by said housing for rotation with said mandrel, dies selectively slidable in said head in a plane perpendicular to the axis of rotation of said mandrel and into stop-swaging engagement with said support rods, a cam follower affixed to each of said dies for rotation therewith, cam members formed with complementary and registrable arcuate cam surfaces, said cam members slidably received in said housing and having abutting edges therewith for reciprocation in a plane perpendicular to said axis of rotation, a control cam rotatable in synchronism with said head, and means selectively operable by said control cam to oppositely displace said cam members toward a first position in which said cam surfaces are in register to define a continuous surface of revolution inoperative to actuate said cam followers, and toward a second position in which said cam surfaces are out of register defining a discontinuous surface of revolution having portions that interfere with the paths of rotation of said cam followers to actuate said dies into stop-swaging engagement with said support rods.

3. A machine for making grid electrodes, comprising a mandrel adapted to receive support rods of indefinite length, a housing for rotatably supporting the mandrel, means for continuously feeding the support rods parallel to the axis of rotation of the mandrel, means for winding and securing a helix of wire about the support rods, and means for forming stop deformations in the support rods at pre-selected longitudinally spaced points thereon, said deformation-forming means comprising a head supported by said housing for rotation with said mandrel, a pair of dies selectively slidable in said head, in a plane perpendicular to the axis of rotation of said mandrel, into stop-swaging engagement with said support rods, a cam follower for and affixed to each of said dies for rotation therewith, a pair of cam members each formed with registering concave arcuate cam surfaces, said cam members slidably received in said housing and having abutted edges for reciprocation in a plane perpendicular to said axis of rotation, a control cam rotatable in synchronism with said head, and linkage means selectively operable by said control cam to relatively reciprocate said cam members toward a first position in which said cam surfaces of each of said cam members are in registry to form a smooth path concentric with said axis of rotation and incapable of actuating said cam followers, and toward a second position in which said cam surfaces define a pair of opposed discontinuities that simultaneously intersect said cam followers to simultaneously actuate said dies into stop-swaging engagement with said support rods.

4. For use in a machine for making grid electrodes, of the type comprising a mandrel receiving support rods of indefinite length, a housing for rotatably supporting the mandrel, means for continuously feeding the support rods parallel to the axis of rotation of the mandrel, and means for winding and securing a helix of wire about the support rods; means for forming stop deformations in the support rods at pre-selected longitudinally spaced points thereon, comprising, in combination; a head supported by said housing for rotation with said mandrel, drive means for rotating said mandrel, dies selectively slidable in said head in a plane perpendicular to the axis of rotation of said mandrel into stop-swaging engagement with said support rods, a cam follower affixed to each of said dies for rotation therewith, cam members formed with circular arcuate cam surfaces of substantially equal radii, said cam members slidably received in said housing and having abutting edges for reciprocation in a plane perpendicular to said axis of rotation, resilient means for biasing said cam members toward a first operational position in which said cam surfaces of each of said cam members mutually form a complete circle concentric with said axis of rotation and not interfering with the paths of rotation of said cam followers, a control cam rotatable in synchronism with said head by said drive means, and means selectively operable by said control cam to relatively reciprocate said cam members toward a second operational position in which said cam surfaces are mutually eccentric to said axis of rotation and define a pair of opposed rise portions followed by abrupt discontinuities, said cam followers over a portion of their paths corresponding to said rise portions being urged toward each other to actuate said dies into stop-swaging engagement with said support rods and over the discontinuous portion of their paths being urged centrifugally away from each other abruptly to disengage said dies from said support rods.

5. In a machine for forming deformations in a work member of indefinite length at pre-selected longitudinally-spaced points thereon, the combination comprising; a mandrel receiving said member, a housing for rotatably supporting said mandrel, means for continuously feeding said member parallel to the axis of rotation of said mandrel, a head supported for rotation with said mandrel by said housing, at least one die received in said head for sliding in a plane perpendicular to the axis of rotation of said mandrel into deforming engagement with said member, a cam follower affixed to said die for rotation therewith, cam members formed with female circular arcuate cam surfaces, said cam members received in said housing and having abutting edges for relative sliding movement in a plane perpendicular to said axis of rotation, a connecting arm pivoted on said housing and drivingly connecting said cam members for mutually opposite sliding movement, a control cam, drive means for rotating said control cam and said head in synchronism, and a rocker arm pivotally mounted on said housing and drivingly connected to one of said cam members, said rocker arm selectively movable by said control cam to slide said cam members connected by said connecting arm toward a first position in which said cam surfaces mutually form a complete circle concentric with said axis of rotation and incapable to actuate said cam followers, and toward a second position in which said cam surfaces are mutually eccentric with said axis of rotation and define first opposed portions positioned to interfere with said cam followers over a portion of their paths of rotation to actuate said dies into deforming engagement with said member and second opposed portions providing abrupt discontinuities relative to said first opposed portions over which said cam followers are centrifugally urged out of engagement with said member.

6. The deformation forming means as defined in claim 1, wherein said control cam means comprise a pair of cam wheels mounted for conjoint rotation about a common axis, said wheels having respective projections mutually adjustably positionable for actuating said swinging means in predetermined time sequence.

References Cited in the file of this patent

UNITED STATES PATENTS

| | | |
|---|---|---|
| 1,897,460 | Anderson et al. | Feb. 14, 1933 |
| 2,181,288 | Washburn | Nov. 28, 1939 |
| 2,188,906 | Lackey | Feb. 6, 1940 |
| 2,426,522 | Porter | Aug. 26, 1947 |
| 2,719,543 | Maurer | Oct. 4, 1955 |
| 2,778,386 | Lindsay | Jan. 22, 1957 |

UNITED STATES PATENT OFFICE
CERTIFICATE OF CORRECTION

Patent No. 3,001,555                      September 26, 1961

Junius B. Neale

It is hereby certified that error appears in the above numbered patent requiring correction and that the said Letters Patent should read as corrected below.

Column 10, lines 14 and 15, for "swinging" read -- swaging --.

Signed and sealed this 6th day of February 1962.

(SEAL)
Attest:

ERNEST W. SWIDER
Attesting Officer

DAVID L. LADD
Commissioner of Patents